US012652648B2

(12) United States Patent
Sabouri-Sichani et al.

(10) Patent No.: US 12,652,648 B2
(45) Date of Patent: Jun. 9, 2026

(54) MULTI-PLMN MUSIM FOR TELECOMMUNICATION SYSTEMS

(71) Applicant: NOKIA TECHNOLOGIES OY, Espoo (FI)

(72) Inventors: Faranaz Sabouri-Sichani, Aalborg (DK); Srinivasan Selvaganapathy, Bangalore (IN); Amaanat Ali, Espoo (FI); Alessio Casati, Surrey (GB)

(73) Assignee: Nokia Technologies Oy, Espoo (FI)

( * ) Notice: Subject to any disclaimer, the term of this patent is extended or adjusted under 35 U.S.C. 154(b) by 569 days.

(21) Appl. No.: 18/000,675

(22) PCT Filed: May 17, 2021

(86) PCT No.: PCT/EP2021/062982
§ 371 (c)(1),
(2) Date: Dec. 2, 2022

(87) PCT Pub. No.: WO2021/244841
PCT Pub. Date: Dec. 9, 2021

(65) Prior Publication Data
US 2023/0232368 A1     Jul. 20, 2023

Related U.S. Application Data

(60) Provisional application No. 63/034,115, filed on Jun. 3, 2020.

(51) Int. Cl.
*H04W 4/00*          (2018.01)
*H04W 8/18*          (2009.01)
(Continued)

(52) U.S. Cl.
CPC ........... *H04W 68/02* (2013.01); *H04W 8/183* (2013.01); *H04W 12/0431* (2021.01)

(58) Field of Classification Search
CPC . H04W 68/02; H04W 8/183; H04W 12/0431; H04W 12/037; H04W 76/15;
(Continued)

(56) References Cited

U.S. PATENT DOCUMENTS 8,977,261 B2 * 3/2015 Chin ................... H04W 60/005
                                                    455/574
9,769,867 B2 * 9/2017 Ramkumar ........... H04W 68/02
(Continued)

OTHER PUBLICATIONS

International Search Report and Written Opinion for International Application No. PCT/EP2021/062982, mailed on Aug. 9, 2021, 11 pages.
(Continued)

*Primary Examiner* — Phuongchau Ba Nguyen
(74) *Attorney, Agent, or Firm* — Brake Hughes Bellermann LLP

(57)          ABSTRACT

There is provided an apparatus, said apparatus comprising at least one processor and at least one memory including a computer program code, the at least one memory and computer program code configured to, with the at least one processor, cause the apparatus at least to: at a user equipment, the user equipment having a first universal subscriber identity module, USIM, associated with a first network and at least one second USIM associated with a second network, provide an indication from the at least one second USIM to the second network that paging notifications for the second network are to be provided to the first USIM of the user equipment via the first network, receive a paging notification for the second network at the first USIM of the user equipment via the first network and provide the paging notification from the first USIM to the second USIM in the user equipment.

13 Claims, 12 Drawing Sheets

| | |
|---|---|
| S1 | At a user equipment, the user equipment having a first USIM associated with a first network and at least one second USIM associated with a second network, providing an indication from the at least one second USIM to the second network that paging notifications for the second network are to be provided to the first USIM of the user equipment via the first network |
| S2 | Receiving a paging notification for the second network at the first USIM of the user equipment via the first network |
| S3 | Providing the paging notification from the first USIM to the second USIM in the user equipment |

(51) Int. Cl.
    *H04W 12/0431*      (2021.01)
    *H04W 68/02*      (2009.01)

(58) Field of Classification Search
    CPC ..... H04W 76/27; H04W 88/06; H04W 68/12;
               H04W 60/005; H04W 28/04; H04W
               72/04; H04W 72/042; H04W 88/08;
               H04W 28/08; H04W 28/084; H04W
               36/22; H04W 72/12; H04L 5/0007
    See application file for complete search history.

(56)             References Cited

U.S. PATENT DOCUMENTS

2018/0220329 A1\*   8/2018   Arumugam ......... H04L 65/1073
2020/0359196 A1\*   11/2020   Balasubramaniam ......................
                                    H04W 88/06

2020/0396591 A1\*   12/2020   Ou ......................... H04W 76/30
2021/0314858 A1\*   10/2021   Wong .................... H04W 88/16
2022/0240213 A1\*   7/2022   Ly .......................... H04W 48/18
2023/0093965 A1\*   3/2023   Velev ................... H04W 68/12
                                          455/458
2023/0276223 A1\*   8/2023   Shaheen ............. H04W 60/005
                                          455/435.1
2024/0137756 A1\*   4/2024   Tiwari ............. H04W 12/0431

OTHER PUBLICATIONS

SA WG2 Meeting #139-e; S2-2003765; "KI#2, KI#3: New Solution: Establishment of Association on User Plane for Paging Notification on User Plane", SA WG2 Temporary Document; Source: Nokia, Nokia Shanghai Bell; Agenda Item: 8.10; Online; Jun. 1-12, 2020; 4 pages.

\* cited by examiner 300
304
303
302
301 a) MUSIM UE with USIMs belonging to same MNO b) MUSIM UE with USIMs belonging to different MNOs

Figure 6:
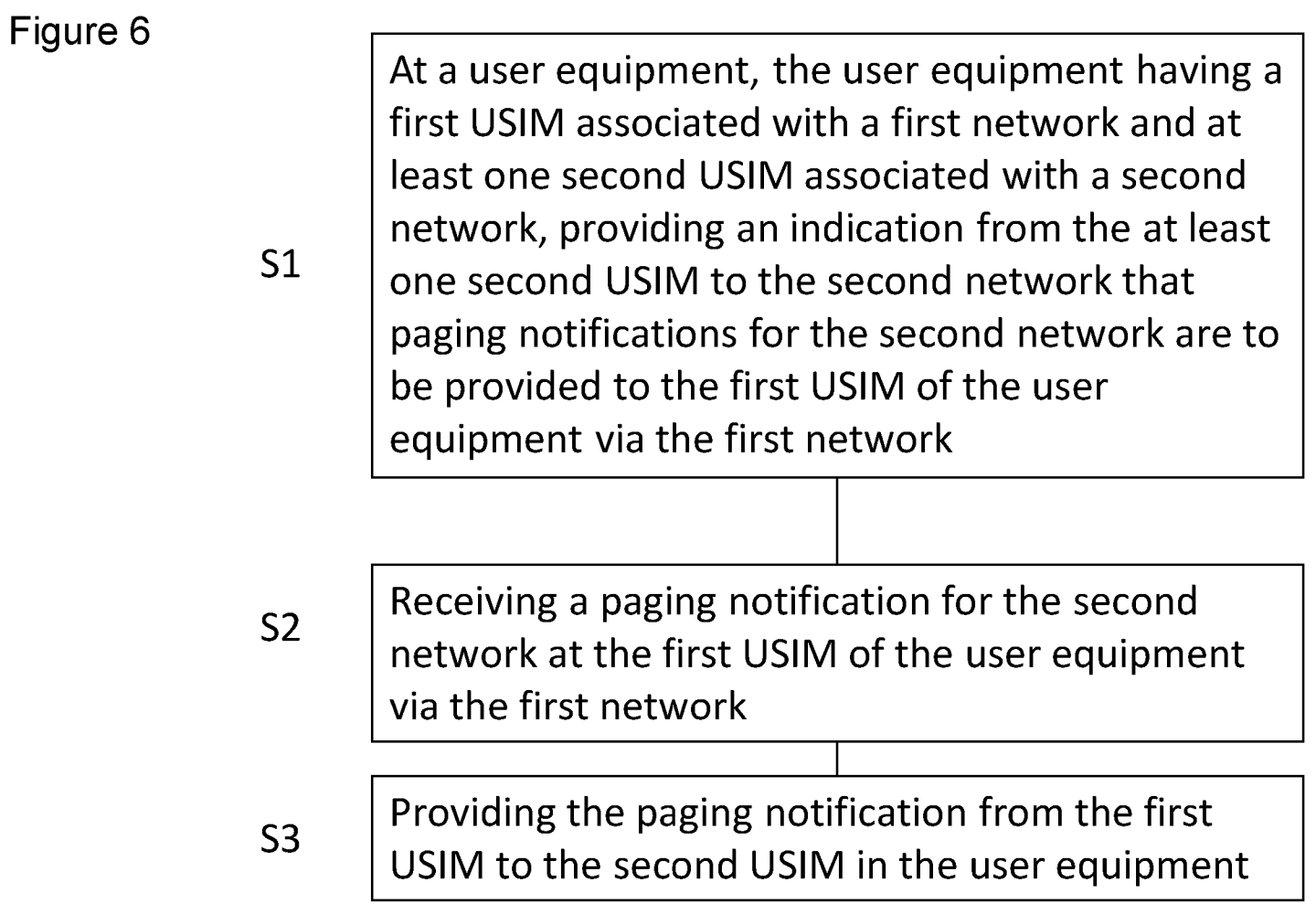

At a user equipment, the user equipment having a first USIM associated with a first network and at least one second USIM associated with a second network, providing an indication from the at least one second USIM to the second network that paging notifications for the second network are to be provided to the first USIM of the user equipment via the first network

S2

Receiving a paging notification for the second network at the first USIM of the user equipment via the first network

S3

Providing the paging notification from the first USIM to the second USIM in the user equipment

Figure 7

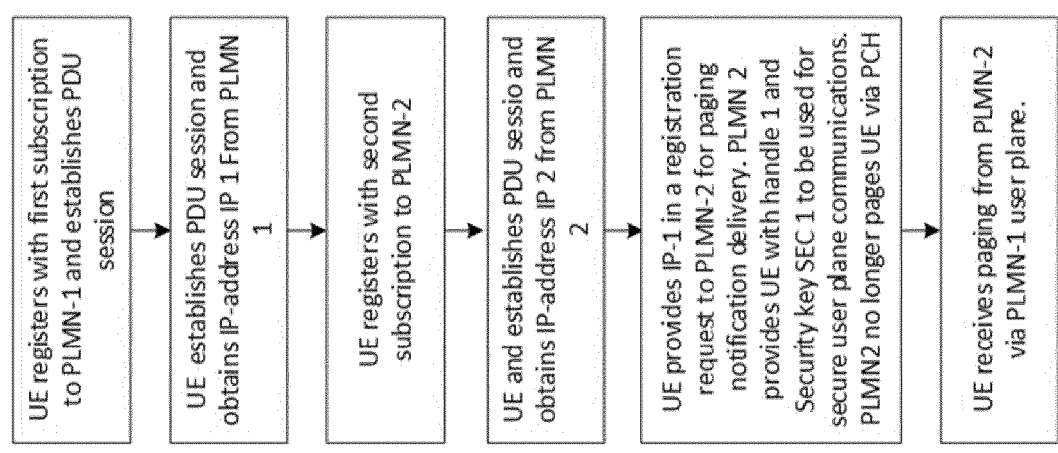

UE registers with first subscription to PLMN-1 and establishes PDU session

UE establishes PDU session and obtains IP-address IP 1 From PLMN 1

UE registers with second subscription to PLMN-2

UE and establishes PDU sessio and obtains IP-address IP 2 from PLMN 2

UE provides IP-1 in a registration request to PLMN-2 for paging notification delivery. PLMN 2 provides UE with handle 1 and Security key SEC 1 to be used for secure user plane communications. PLMN2 no longer pages UE via PCH UE receives paging from PLMN-2 via PLMN-1 user plane.

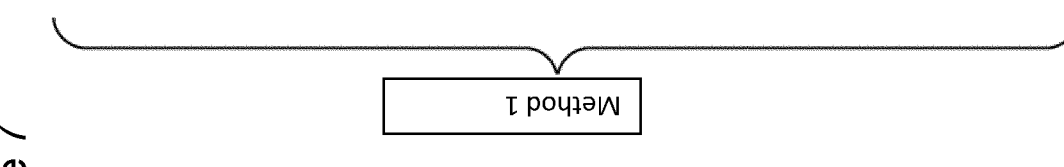

Method 1

MULTI-PLMN MUSIM FOR TELECOMMUNICATION SYSTEMS

CROSS-REFERENCE TO RELATED APPLICATIONS

This application is a national stage entry of International Application No. PCT/EP2021/062982, filed May 17, 2021, entitled "MULTI-PLMN MUSIM FOR TELECOMMUNI-CATION SYSTEMS" which claims the benefit of priority of U.S. Provisional Application No. 63/034,115, filed Jun. 3, 2020, both of which are hereby incorporated by reference in their entireties.

FIELD

The present application relates to a method, apparatus, system and computer program and in particular but not exclusively to multi-PLMN MUSIM paging reception via one PLMN.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

BRIEF DESCRIPTION OF THE DRAWINGS

FIG. 6 shows a flowchart of a method according to an example embodiment.
FIG. 8 shows a more detailed signalling flow for an example embodiment such as that shown in FIG. 7.
FIG. 9 shows a signalling flow for an example embodiment where PLMN-1 is the master PLMN and UE-2 wants to initiate a mobile originated call.

DETAILED DESCRIPTION

Figure 1:
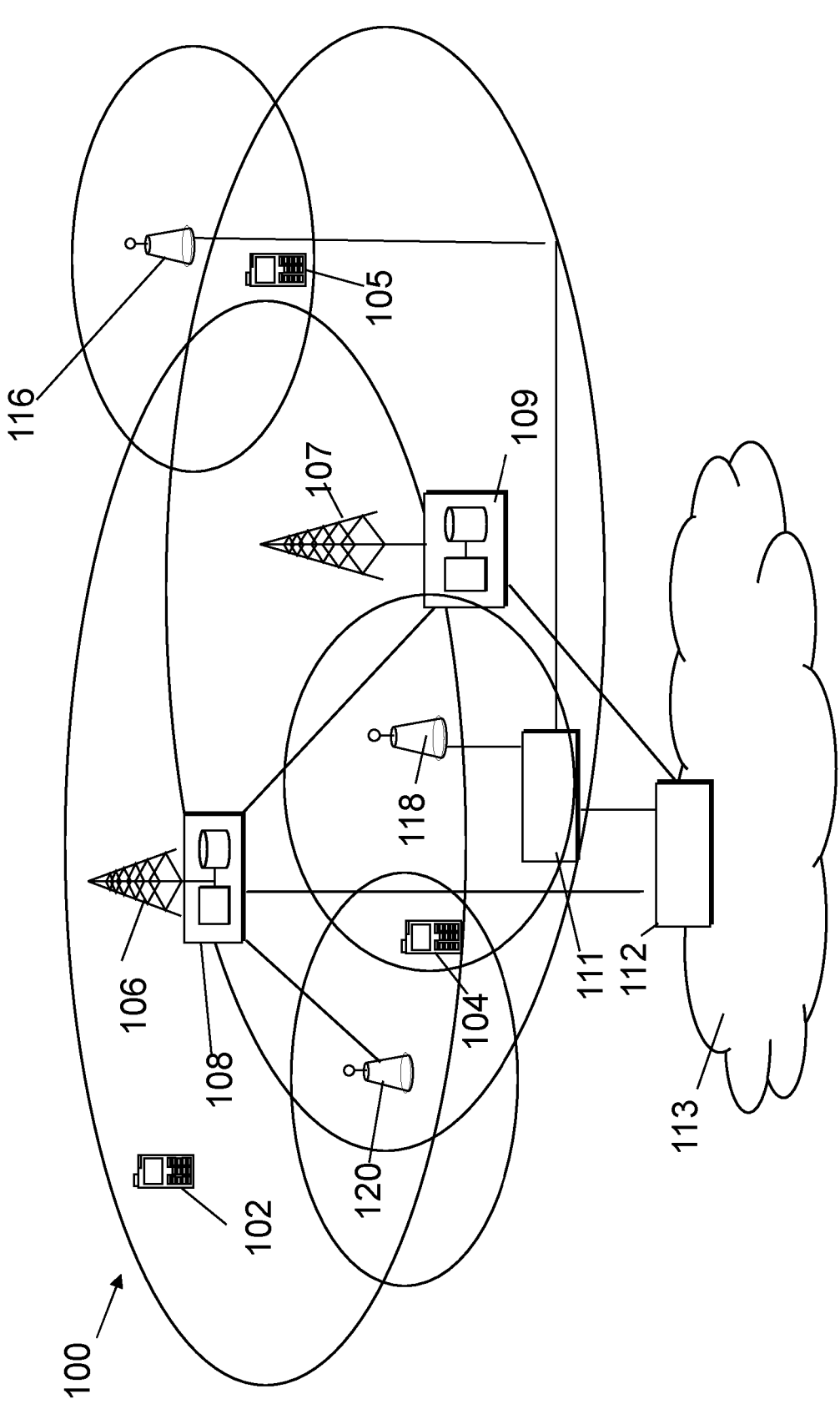
FIG. 1 is a block diagram of a system.

The first proposal and the registration via N3WIF in the alternative proposal) implies that there will be a need to maintain these registrations with keep alive messages that may increase battery consumption.

That is, paging may be missed when a UE is in RRC-_CONNECTED with one USIM and cannot receive parallel paging from other networks (corresponding to the rest of its USIMs) without being configured with "gaps" in its connection or a UE is in RRC_IDLE or RRC_INACTIVE on all the USIMs and the paging occasions for two (or more) USIMs collide.

FIG. 6 shows a flowchart of a method according to an example embodiment.

In a first step, S1, the method comprises, at a user equipment, the user equipment having a first USIM associated with a first network and at least one second USIM associated with a second network, providing an indication from the second USIM to the second network that paging notifications for the second network are to be provided to the first USIM of the user equipment via the first network.

In a second step, S2, the method comprises receiving a paging notification for the second network via the first network at the first USIM of the user equipment.

In a third step, S3, the method comprises providing the paging notification from the first USIM to the second USIM.

The method may comprise receiving the paging notification for the second network via a user plane of the first network.

In response to the paging notification, the UE may provide a busy response to the second network from the second USIM via the first network. The busy response may be sent via the user plane of the first network. Alternatively, in response to the paging notification, the UE may connect to the second network.

The user equipment may be registered with the first network and the second network. The method may also be supported on EPS where registration is replaced by Attach/TAU procedures (and the AMF by MME).

The method may comprise receiving an indication from at least one of the first network and the second network that at least one of the first network and the second network supports providing paging notification via another network. This indication may be provided either in broadcast channel or in registration response message.

The method may comprise providing an identifier of the second network to the first network or an identifier of the first network to the second network. The identifier of the first network and the second network may comprise an IP address of the first network and the second network, respectively. The identifier may be provided during a registration procedure.

The first network (e.g., AMF-1 or MME-1) may provide a first security key (e.g., SEC-2) to the user equipment for use in encrypting the notification of paging for the second network. The second network (e.g., AMF2 or MME2) may provide a second security key (e.g., SEC-1) to the user equipment for use in encrypting the notification of paging for the first network. The first and second security key may be provided in a registration response message from the first network and the second network, respectively. Alternatively, the UE may provide the first security key to the first network and the second security key to the second network.

The method may also comprise receiving a first handle (e.g., Handle-2) from the first network and a second handle (e.g., Handle-1) from the second network. The handle may be provided to the UE in a registration accept message.

Figure 8:
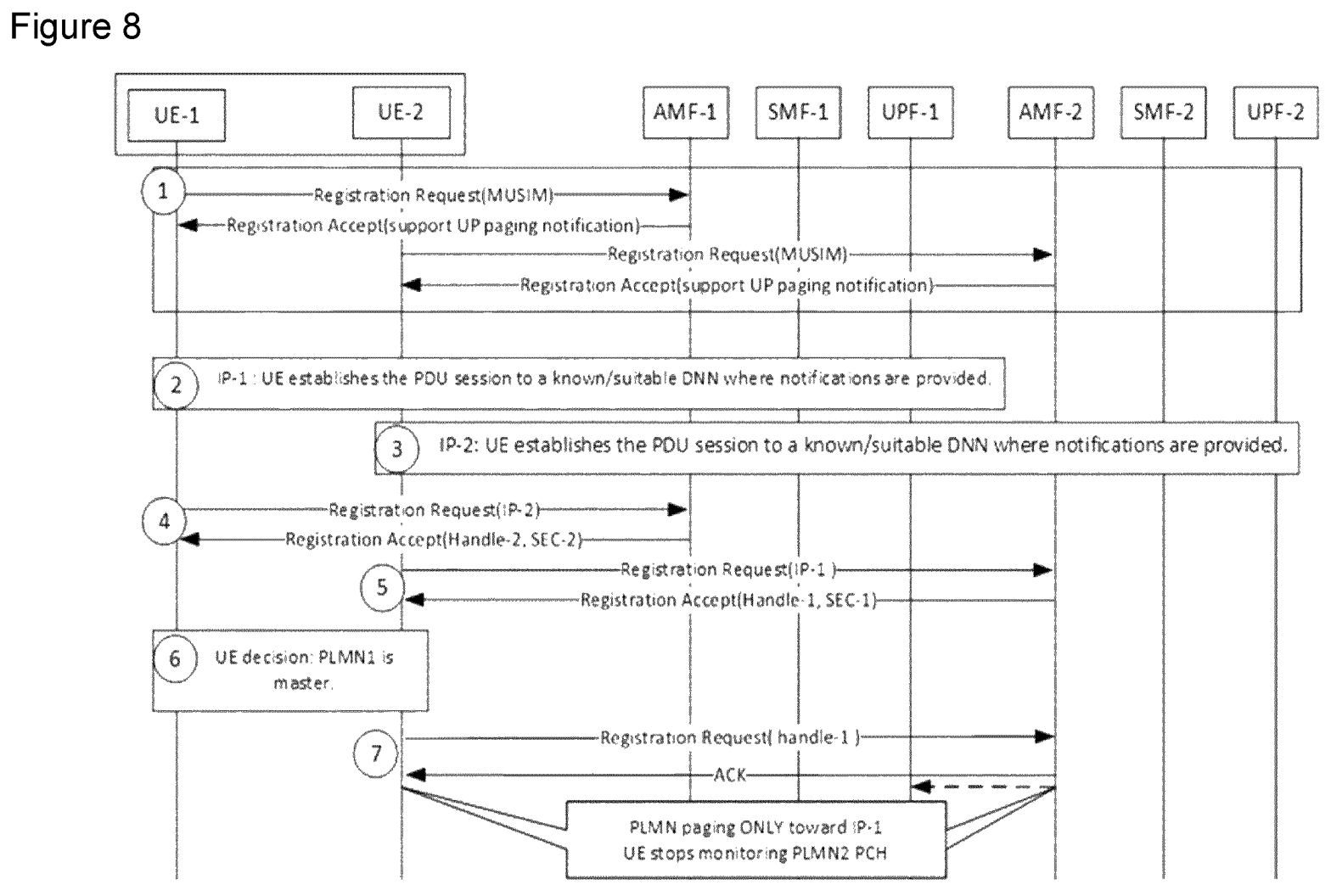
Figure 8:
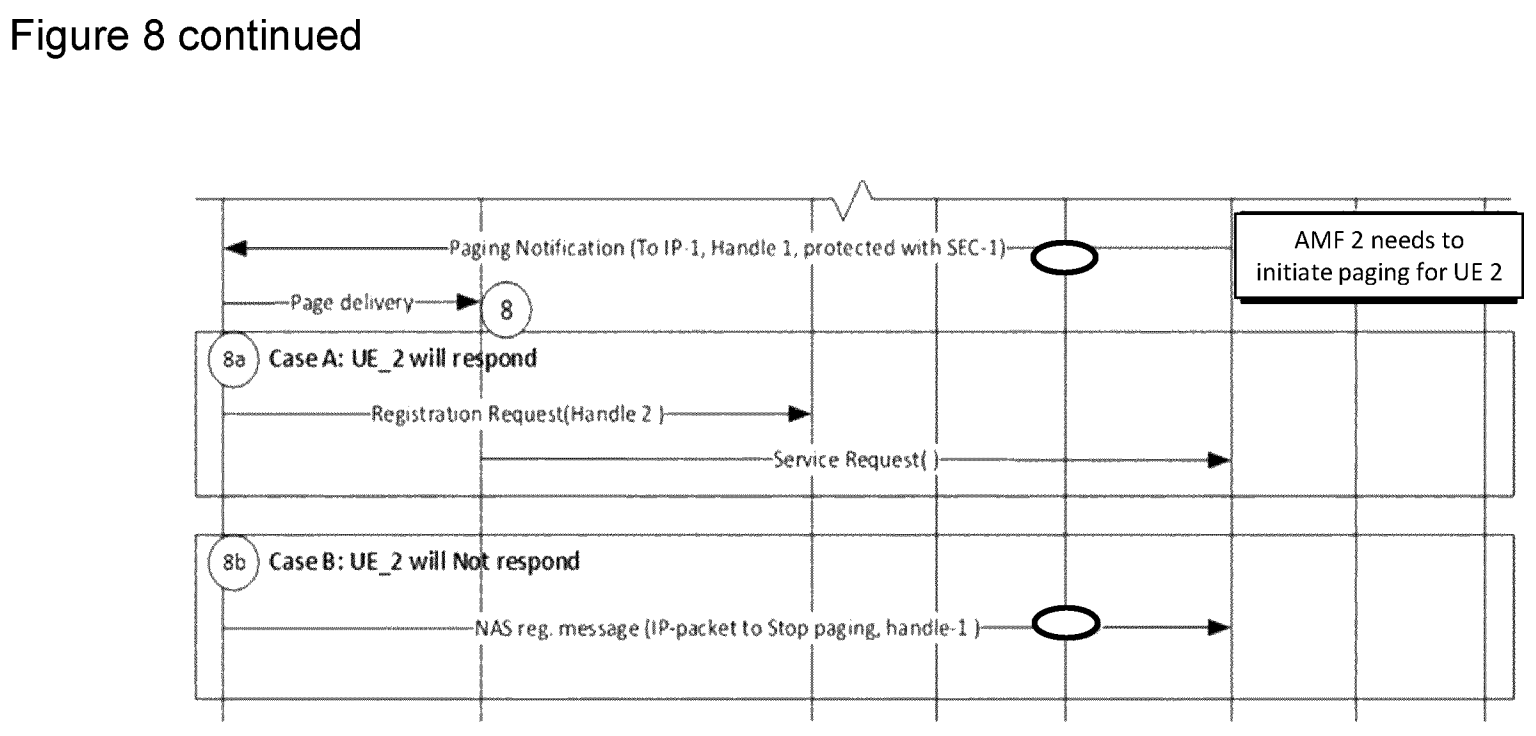

The examples are illustrated in the signalling flow of FIG. 8.

The indication from the second USIM to the second network that paging notifications for the second network are to be provided to the first USIM of the user equipment via the first network may comprise the handle received from the second network. The indication may be provided in a registration procedure, e.g., in a Registration Request message.

The handle is used by the UE to specify to the respective network (the one which provided the given handle) that it is receiving paging notifications from the other network. The respective network shall not start considering the other network active for such task till the UE indicates so by a subsequent registration with the given handle.

At any time the UE and PLMN may refresh this handle value and related security key when executing a registration procedure.

The first network may comprise a first PLMN. The second network may comprise a second PLMN.

In the method, paging notifications (e.g., paging messages) are provided from all the PLMNs a UE (e.g., a MUSIM) is registered at, using only one of the PLMNs. The UE monitors one paging channel or user plane in a given PLMN, defined as a primary or master PLMN, to receive paging from that PLMN or user plane notifications of paging from the other PLMN(s). PLMN is defined as primary/master PLMN.

The method may comprise determining to use the first network for receiving paging notifications for the second network when the first USIM of the user equipment is in radio resource control idle mode with the first network and the second USIM of the user equipment is in radio resource control idle mode with the second network.

When all the USIMs within UE are in idle or inactive mode, the paging message for all the USIM is transmitted via the master network. UE monitors the paging channel and paging occasion of the master network for paging. All other USIM idle mode operation may only be limited to measurements for idle mode mobility.

The UE determines which network is defined as the network (the master network) to provide the UE paging messages either directly from the network or as IP-packets forwarded from the other networks.

This determination may be a UE-specific implementation. One example would be the UE utilizes the very first PLMN it registered to as master. Alternatively, the MUSIM UE selects the one where it is currently connected, if in all other PLMNs the UE is idle mode.

When (for example) the UE selects PLMN-1 to act as the PLMN where the user plane paging notification need to be delivered for UE-2 (i.e. PLMN1 is master), it causes UE-2 to indicate to PLMN-2 in a registration message that the PLMN identified by Handle-1 is ready to take paging notifications on the user plane for UE-2 at IP-1. This stops PLMN-2 delivering paging on the control plane for UE-2. UE-2 stops monitoring paging channel on PLMN-2. It can be observed that If PLMN-1 and PLMN-2 are the same PLMN, there is no difference in behaviour as the handle per se identifies a UE+PLMN pair and not just a PLMN.

The method may comprise determining to use the first network for receiving paging notifications for the second network when the first USIM of the user equipment is in radio resource control connected mode with the first network and the second USIM of the user equipment is in radio resource control idle mode with the second network and comprising means for determining to use the first network for receiving paging notifications for the second network.

When the second USIM of the user equipment moves to radio resource control connected mode with the second network, the method may comprise determining to use the second network for receiving paging notifications for the first network and providing an indication from the first USIM to the first network that paging notifications for the first network are to be provided to the second USIM of the user equipment via the second network.

The indication from the first USIM to the first network that paging notifications for the first network are to be provided to the second USIM of the user equipment via the second network may comprise the handle received from the first network.

For example, if one of the USIMs (second PLMN) radio connection transition to connected mode and establishes IP connectivity, this USIM radio connection may become the master link for forwarding paging for the other PLMNs of different USIMs in idle mode. Here the current master node is informed to disable its (first PLMN) role as master link for paging and instead switch its paging to this link (second PLMN). As such, the master role moves from one PLMN to another.

The UE may inform the current master node (first network) to switch to new master node (second network) via a 3GPP link of master network. This may require a RRC connection procedure and NAS message to inform the new master node (second PLMN) when UE becomes connected in different node.

The UE may also inform the current master node via IP based registration.

The paging reception may be via the master link which is not the UE's own 3GPP link and master link may be switched along with the paging and page-response procedure.

When the paging message for the second network is received via the user plane of the first network, prior to release of RRC connection and switching to the second network, the NAS layer of UE the first network to switch the paging link to the second network.

The RRC connection for the USIM with the first network is released and the USIM which received the paging message switches to its 3GPP network to setup RRC connection to send paging response.

When the active connection is released, i.e. the UE is in idle/inactive with all its USIMs, the network which had active connection may continue to be the master link for all other USIMs until the next active connection is established.

By default the old master link is used for paging unless until the UE decides to switch the master link to a new link (for example the UE decides to start paging monitoring on the second PLMN instead of the first PLMN necessitating a switch of the master, otherwise, the paging may be missed from the first PLMN). This solution may involve more frequent switching of the master PLMN, but offer more flexibility when needed. That is, the method may comprise determining to use the second network for receiving paging notifications for the first network; and providing an indication to the first network that paging notifications for the first network are to be provided to the user equipment via the second network.

A secured mechanism may be provided for UE and AMF to communicate via the IP address provided by another PLMN. The AMF and UE generate a security key for given IP address via which the forwarding of signalling messages will take place. Along with the security key, the AMF generates a handle for the security association. Any communication via the IP address is secured using the keys generated and this packet will also include the handle associated with the security key.

At present there are no available mechanisms for coordinating actions between networks for MUSIM operation. The method may address missed paging, for example when a UE is in RRC_CONNECTED with one USIM and cannot receive parallel paging from other networks (corresponding to the rest of its USIMs) without being configured with "gaps" in its connection or UE is in RRC_IDLE or RRC_INACTIVE on all the USIMs and the paging occasions for two (or more) USIMs may collide.

In one example embodiment there is provided a mechanism for a UE capable of multiple USIM to receive the paging in idle mode via one of the selected PLMNs (e.g. first PLMN) of different USIMs. In the following, the selected PLMN and the paging link is known as master link for paging.

Figure 7:
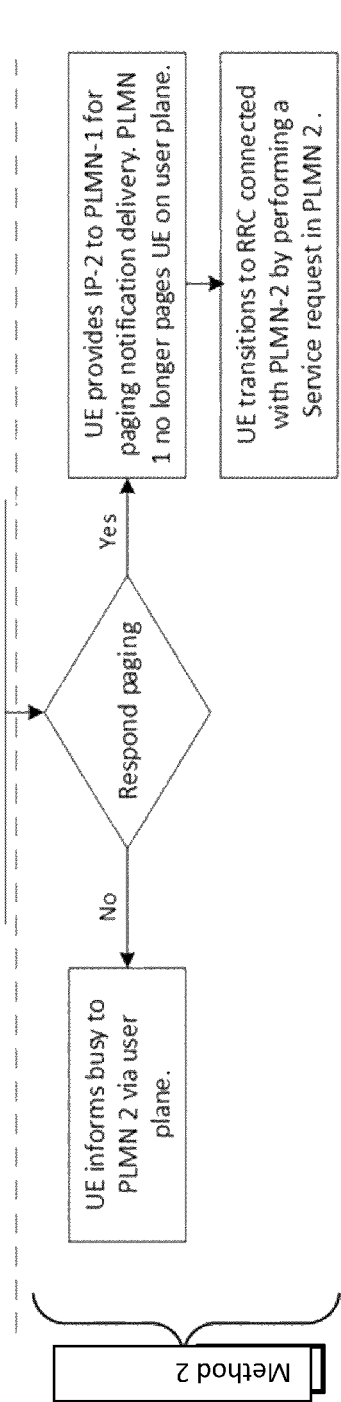
FIG. 7 shows a high level flowchart for an example embodiment of a UE's communication with its respective PLMNs.

FIG. 7 shows a high level flowchart for an example embodiment of a UE's communication with its respective PLMNs. In this example embodiment, a dual USIM device is considered with two USIMs belonging to the same or different vendor and registered at their respective PLMNs as two independent UEs. The term UE-1 and UE-2 is used to refer to the UE seen at network corresponding to its USIM-1 and USIM-2, respectively, even though the UE is a single device which is sharing one or more HW and SW elements. A single link, referred to as master link for paging in the following, from PLMN-1 or PLMN-2 is used to send paging messages to the device. PLMN-1 and PLMN-2 need not be the HPLMN of the UE-1 for USIM-1 and UE-2 USIM-2. PLMN-1 and PLMN-2 are the serving PLMNs the UEs select.

There are two main use cases, with the UE-1/UE-2 being in (1) RRC_CONNECTED/(RRC_IDLE or RRC_INACTIVE) or (2) (RRC_IDLE or RRC_INACTIVE)/(RRC_IDLE or RRC_INACTIVE).

Although a MUSIM device with two USIM is considered in this example, the method is applicable for multiple USIM use case with more than two USIMs.

In the example method shown in the flow chart of FIG. 7, the UE registers with a first subscription to PLMN-1 and establishes a PDU session. The UE obtains IP address IP-1 from PLMN-1. The UE also registers with a second subscription to PLMN-2 and establishes a PDU session. The UE obtains IP address IP-2 from PLMN-2.

The UE provides IP-1 in a registration request to PLMN-2 for paging notification delivery. PLMN-2 provides UE with handle 1 and security key SEC-1 to be used for secure user plane communications. PLMN2 no longer pages UE via paging channel (PCH).

The UE receives paging from PLMN-2 via PLMN-1 user plane.

When (for example) UE-2 receives on PLMN-1 a notification at IP-1, this notification message is encrypted, and integrity protected by using the Key that UE-2 had provided and it includes that it needs to respond to a page for PLMN-2 and the Handle-1 to identify the UE-2 in PLMN-2 and the security association. The details of the paging notification format are FFS but it may include a correlation ID to identify the paging transaction.

The UE responds to the paging, either informing busy to PLMN2 via the user plane or providing IP-2 to PLMN-1 for paging notification delivery. PLMN-1 no longer pages UE on the user plane. The UE transitions to RRC connected with PLMN-2 by performing a service request in PLMN 2.

If the UE-2 decides to accept the paging notification, it shall indicate by registration message to AMF-1 that PLMN identified by Handle-2 is becoming the one receiving paging notifications on user plane at IP-2 for UE-1, and then UE-2 proceed to execute a service request in PLMN-2. PLMN-1 stops paging the UE on C-plane in PLMN-1.

If the UE-2 decides NOT to respond to paging, it provides a response on the user plane by replying to the incoming paging message, indicating to AMF-2 to stop paging the ongoing paging on user plane towards IP-1 for UE-2 as it is busy. The AMF-2 includes in the paging notification a correlation value so it can understand what paging notification a response about. This message uses the Handle-1 provided to AMF-2 by UE-2 to identify IP-1 on PLMN-1 for the AMF-2 to understand the security association and decrypt the message using the secret key UE-2 has provided for IP-1.

FIG. 8 shows a more detailed signalling flow for an example embodiment such as that shown in FIG. 7.

In step 1, the UE registers as UE-1 on PLMN-1 by providing a Registration Request from UE-1 to AMF-1 and receiving a Registration Accept message from AMF-1 at UE-1. The UE registers as UE-2 on PLMN-2 by providing a Registration Request from UE-2 to AMF-2 and receiving a Registration Accept message from AMF-2 at UE-2. The PLMNs provide indication about whether they support paging notification via user plane of the other network. In this example it is supposed that both the two PLMNs support UP notification This information could be provided either in broadcast channel or in registration response message. In this example embodiment, the indication is in the Registration Accept message.

In step 2, UE-1 establishes a PDU session on PLMN-1 which is suitable to obtain notifications via the internet or other suitable Inter-PLMN network. This corresponds to IP-1. If the UE is behind a NAT, IP-1 may also be the result of a NAT traversal binding as observed by a server in PLMN-2 (in which case also a port number for NAT traversal may be added part of this information also).

In step 3, UE-2 establishes a PDU session on PLMN-2 which is suitable to obtain notifications via the internet or other suitable inter-PLMN network. This corresponds to IP-2. If the UE is behind a NAT, IP-2 may also be the result of a NAT traversal binding as observed by a server in PLMN-2 (in which case also a port number for NAT traversal may be part of this information also).

In step 4, UE-1 performs a further registration procedure and provides the PLMN-1 AMF with IP-2 in the Registration Request. The AMF-1 provides the security key, SEC-2, to the UE in the Registration Accept. The security key, SEC-2, is used by AMF-1 to encrypt and integrity protect the notifications towards IP-2. AMF-1 also returns to the UE-1 a handle, Handle-2, for PLMN-2 that UE-1 needs to use to specify that PLMN-2 is actively receiving paging notifications on user plane for PLMN-1 and UE-1 at IP-2. (AMF-1 shall not start considering PLMN-2 active for such task till the UE indicates so by a subsequent registration with this handle). At any time, the UE-1 and PLMN-1 may refresh this Handle value and related security key SEC-2 when executing a registration procedure. IP-2, Handle-2, SEC2 are stored in the AMF-1 UE context.

In step 5, UE-2 performs a further registration procedure and provides the PLMN-2 AMF with the IP-1 in the Registration Request. AMF-2 provides a security key, SEC-1, in the Registration Accept. AMF-2 uses the security key, SEC-1, to encrypt and integrity protect the notifications towards IP-1. AMF-2 also returns to the UE-2 a Handle, handle-1, for PLMN-1 that UE-2 needs to use to specify that PLMN1 is actively receiving paging notifications on user plane for PLMN2 and UE2 at IP-1. (AMF-2 shall not start considering PLMN-1 active for such task till the UE indicates so by a subsequent registration with this handle). At any time the UE2 and PLMN2 may refresh this Handle-1 value and related security key SEC-1 when executing a registration procedure. IP-1, Handle-1, SEC-1 are stored in the AMF-2 UE context.

In step 6, the UE determines PLMN-1 to act as the PLMN where the user plane paging notification need to be delivered for UE-2 (i.e., PLMN1 is master).

In step 7, UE-2 indicates to PLMN-2 in a registration message that the PLMN identified by Handle-1 is ready to take paging notifications on the user plane for UE-2 at IP-1. This stops PLMN-2 delivering paging on the control plane for UE-2. UE-2 stops monitoring the paging channel.

When he AMF-2 needs to page UE-2, since UE-2 is registered for push notification, AMF-2 initiates paging on the user plane towards IP-2 securing the notification with SEC-1 and prepending handle-1 for identification of security association. UE-1 received the paging notification on the user plane. It detects the handle is associated to USIM2. So it delivers the notification to UE-2.

In step 8, the UE-2 receives on PLMN-1 a paging notification at IP-1. The paging notification message is encrypted, and integrity protected by using the Key SEC-1. The paging notification includes that the UE needs to respond to a page for PLMN-2 and the Handle-1 to identify the UE-2 in PLMN-2 and the security association.

In step 8a, where UE-2 decides to respond, UE-1 indicates by registration message to AMF-1 that PLMN identified by Handle-1 is becoming the one receiving paging notifications on user plane at IP-2 for UE-1. UE-2 proceeds to execute a service request in PLMN-2. PLMN-1 stops paging the UE on C-plane in PLMN-1.

In step 8b, where UE-2 decides not to respond to paging, UE-1 provides a response on the user plane by replying to the incoming paging message, indicating to AMF-2 to stop paging the ongoing paging on user plane towards IP-1 for UE-2 as it is busy. The AMF-2 includes a handle-1 in the paging notification so that the AMF-2 understands to which paging notification a response has been provided The response uses the Handle-1 provided to AMF-2 by UE-2 to identify IP-1 on PLMN-1 for the AMF-2 to understand the security association and decrypt the message using the secret key UE-2 has provided for IP-1.

Figure 9:
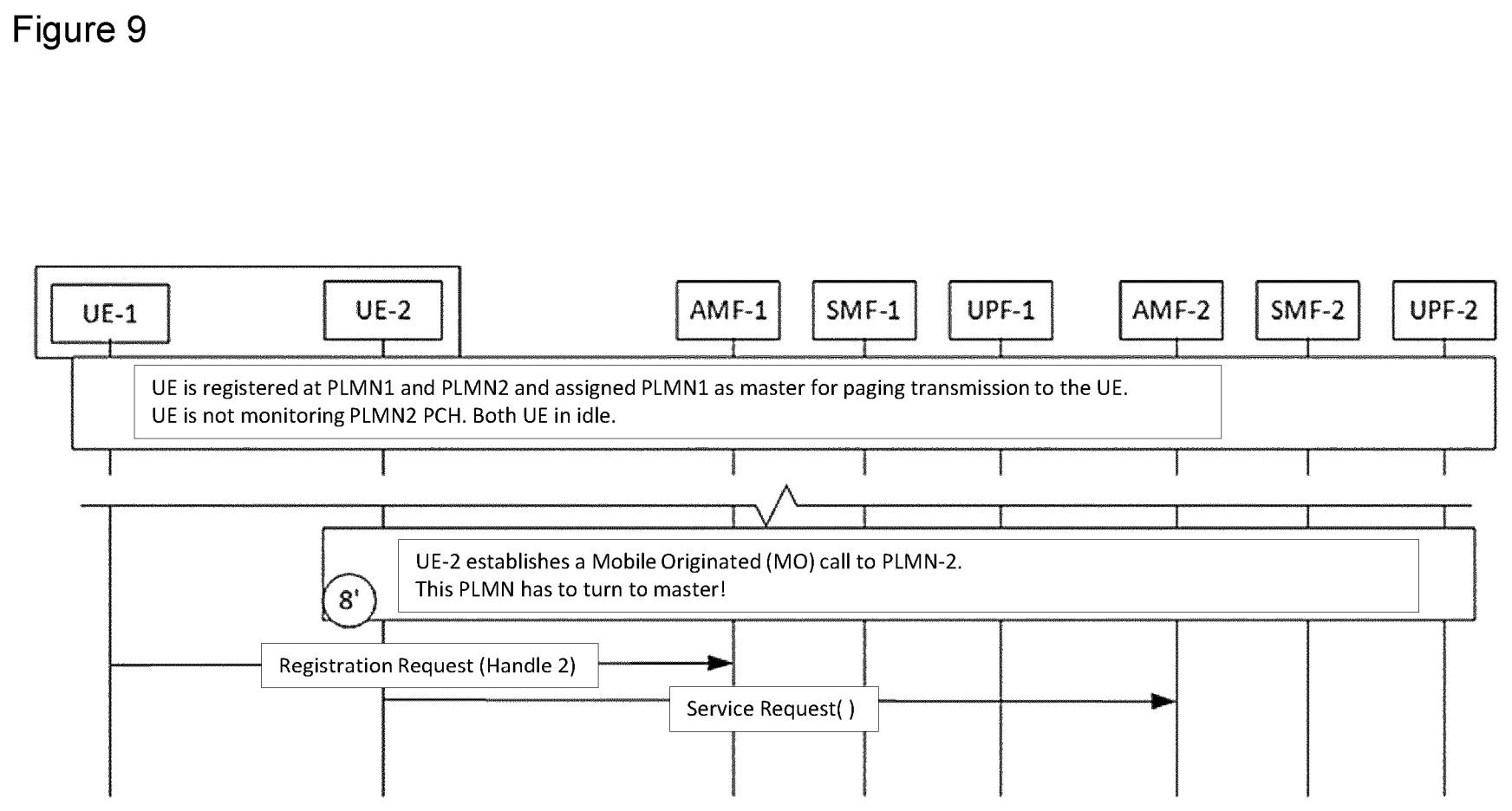

A Push notification server is not illustrated in FIG. 8 however the deployment may comprise the AMFs interacting with a push notification server by an open interface used to relay the messages to and from it. Messages from the UE to the Push notification server shall include the Globally Unique AMD Identity (GUAMI) for routing purposes. FIG. 9 shows a signalling flow for an example embodiment where PLMN-1 is the master PLMN and UE-2 wants to initiate a mobile originated call.

UE1 may register with AMF1 that PLMN 2 is the new master PLMN by providing Handle 2. UE2 may establish a connection with PLMN 2.

It can be appreciated that since the UE and AMF have a security relationship on user plane, if for latency reason the standards prefer Step 1 to take place on user plane of PLMN 2, that can also be done but there may be a small gap over which the UE is paged on the c-plane of PLMN 1 and the UE is not reachable (so when the AMF in PLMN 1 receives the UP-registration message from UE1 using PLMN 2 user plane, then the paging needs to be directed immediately to the user plane and paging on control plane needs to be stopped on PLMN 1).

Also, it may be appreciated that NAS mobility management procedures like periodic updates may be encapsulate on user plane while a UE is reachable on user plane.

Figure 2:
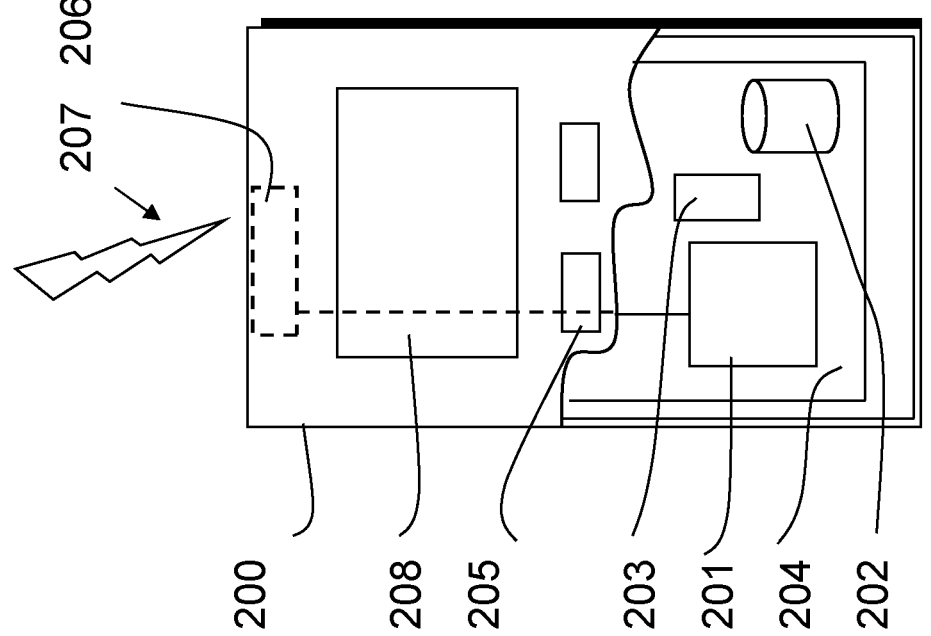
FIG. 2 is a diagram illustrating a user equipment.
Figure 3:
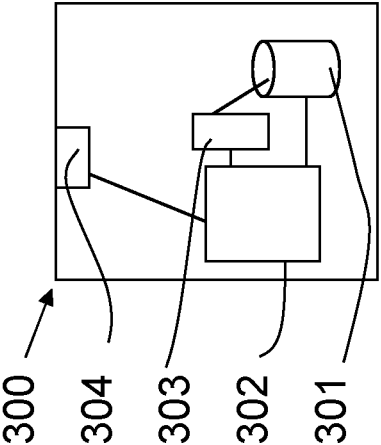
FIG. 3 is a diagram illustrating a control apparatus.
Figure 4:
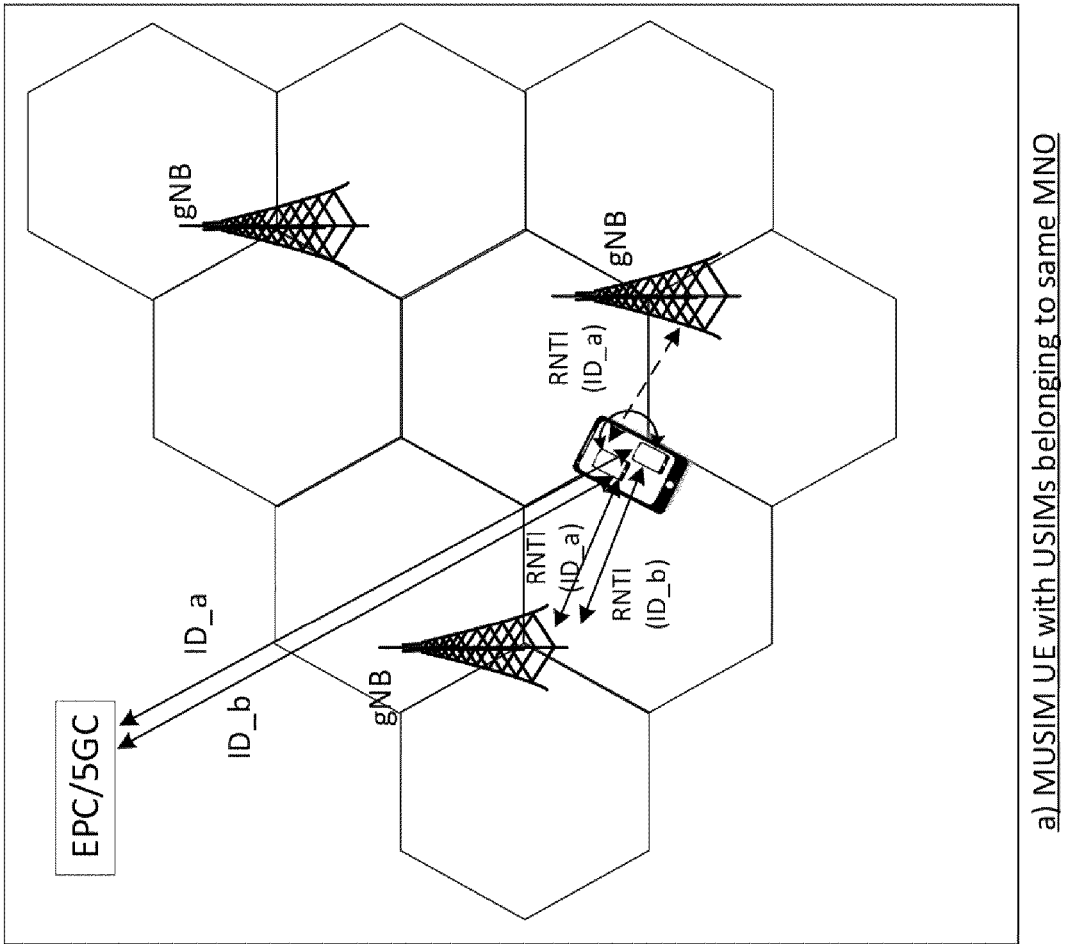
FIG. 4 is a diagram illustrating a MUSIM UE.
Figure 4:
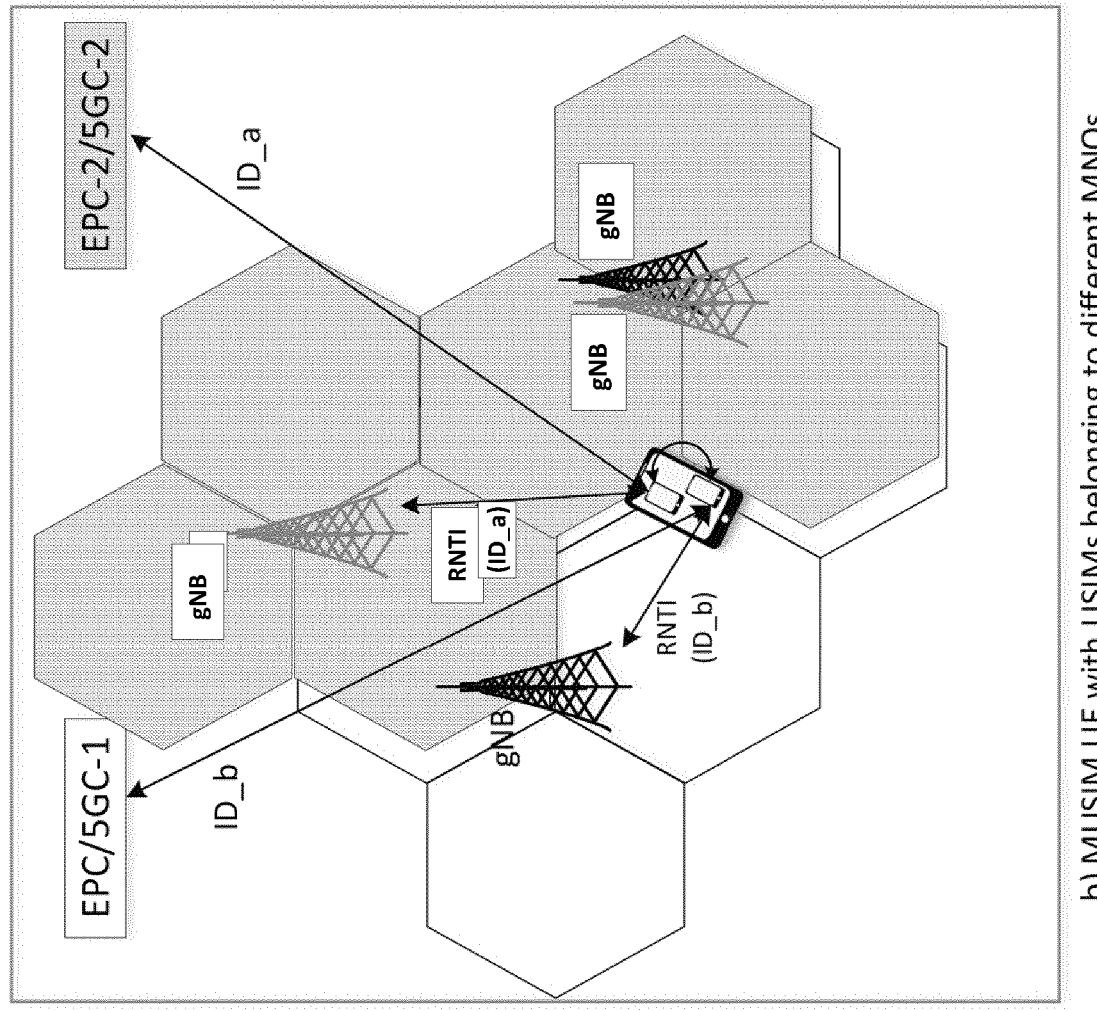
Figure 5:
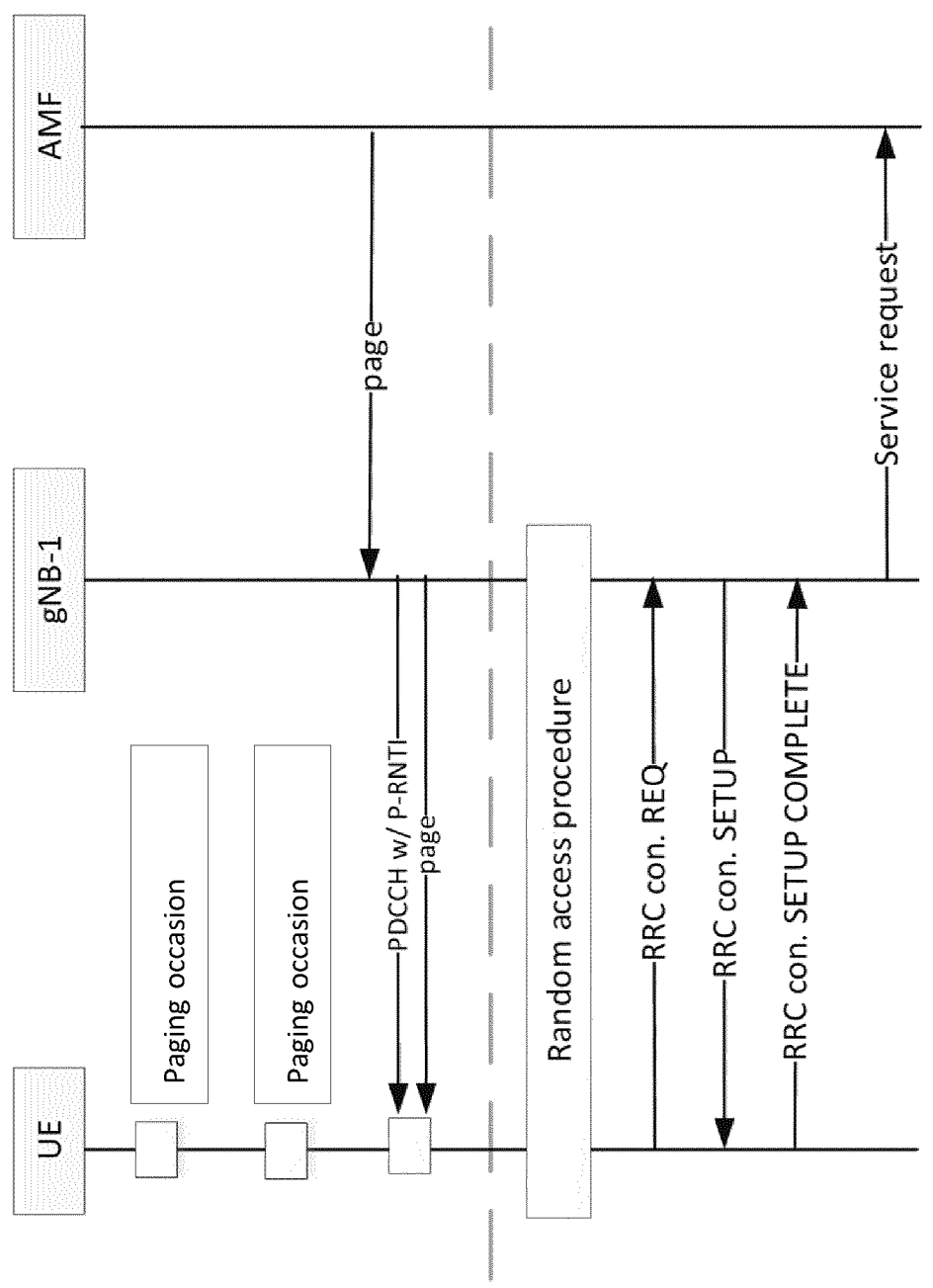
FIG. 5 is a signalling diagram of a UE and other entities.

The method may be implemented in a user equipment as described with reference to FIG. 2 or a control apparatus as described with reference to FIG. 3.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where multiple USIMS are in use. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. A user equipment having a first universal subscriber identity module, USIM, associated with a first network and at least one second USIM associated with a second network, wherein the first USIM of the user equipment is in radio resource control idle mode with the first network and the second USIM of the user equipment is in radio resource control idle mode with the second network, the user equipment comprising:

at least one processor and at least one memory including a computer program code, the at least one memory and computer program code configured to, with the at least one processor, cause the user equipment at least to:

determine to use the first network for receiving paging notifications for the second network;

provide an indication from the at least one second USIM to the second network that paging notifications for the second network are to be provided to the first USIM of the user equipment via the first network;

receive a paging notification for the second network at the first USIM of the user equipment via the first network; and provide the paging notification from the first USIM to the second USIM in the user equipment.

2. The user equipment according to claim 1, wherein the at least one memory and computer program code are configured to, with the at least one processor, cause the user equipment at least to:

in response to the paging notification, provide a busy response from the second USIM of the user equipment to the second network via the first USIM in the user equipment and the first network.

3. The user equipment according to claim 1, wherein the at least one memory and computer program code configured to, with the at least one processor, cause the user equipment at least to:

provide a security key to the first network for encrypting the notification of paging for the second network.

4. The user equipment according to claim 1, wherein the at least one memory and computer program code configured to, with the at least one processor, cause the user equipment at least to:

provide an identifier of the second network to the first network.

5. The user equipment according to claim 4, wherein the identifier of the second network comprises an IP address.

6. The user equipment apparatus-according to claim 1, wherein the at least one memory and computer program code configured to, with the at least one processor, cause the user equipment at least to:

receive the paging notification for the second network via a user plane of the first network.

7. The user equipment according to claim 1, wherein the first USIM of the user equipment is in radio resource control connected mode with the first network and the second USIM of the user equipment is in radio resource control idle mode with the second network and wherein the at least one memory and computer program code are configured to, with the at least one processor, cause the user equipment at least to:

determine to use the first network for receiving paging notifications for the second network.

8. The user equipment according to claim 7, wherein the second USIM of the user equipment moves to radio resource control connected mode with the second network and wherein the at least one memory and computer program code are configured to, with the at least one processor, cause the user equipment at least to:

determine to use the second network for receiving paging notifications for the first network; and provide an indication from the first USIM to the first network that paging notifications for the first network are to be provided to the second USIM of the user equipment via the second network.

9. The user equipment according to claim 1, wherein the at least one memory and computer program code are configured to, with the at least one processor, cause the user equipment at least to:

receive an indication from at least one of the first network and the second network that at least one of the first network and the second network supports providing paging notification via another network.

10. The user equipment according to claim 1, wherein the first USIM of the user equipment is registered with the first network and the second USIM of the user equipment is registered with the second network.

11. The user equipment according to claim 1, wherein the first USIM of the user equipment is configured to perform at least one of attach and tracking area update procedures with the first network and the second USIM of the user equipment is configured to perform at least one of attach and tracking area update procedures with the second network.

12. A method comprising:

at a user equipment, the user equipment having a first universal subscriber identity module, USIM, associated with a first network and at least one second USIM associated with a second network, wherein the first USIM of the user equipment is in radio resource control idle mode with the first network and the second USIM of the user equipment is in radio resource control idle mode with the second network, determining to use the first network for receiving paging notifications for the second network;

providing an indication from the at least one second USIM to the second network that paging notifications for the second network are to be provided to the first USIM of the user equipment via the first network;

receiving a paging notification for the second network at the first USIM of the user equipment via the first network; and providing the paging notification from the first USIM to the second USIM in the user equipment.

13. The method of claim 12, comprising:

in response to the paging notification, providing a busy response from the second USIM of the user equipment to the second network via the first USIM in the user equipment and the first network.

\* \* \* \* \*